(12) United States Patent
Miu

(10) Patent No.: US 11,754,705 B2
(45) Date of Patent: Sep. 12, 2023

(54) ADVANCED DRIVER-ASSISTANCE AND AUTONOMOUS VEHICLE RADAR AND MARKING SYSTEM

(71) Applicant: MAGNA ELECTRONICS INC., Auburn Hills, MI (US)

(72) Inventor: Traian Miu, Oakville (CA)

(73) Assignee: Magna Electronics Inc., Auburn Hills, MI (US)

(*) Notice: Subject to any disclaimer, the term of this patent is extended or adjusted under 35 U.S.C. 154(b) by 0 days.

(21) Appl. No.: 17/446,856

(22) Filed: Sep. 3, 2021

(65) Prior Publication Data

US 2021/0396871 A1    Dec. 23, 2021

Related U.S. Application Data

(63) Continuation of application No. 16/273,549, filed on Feb. 12, 2019, now Pat. No. 11,112,498.

(Continued)

(51) Int. Cl.
*G01S 13/931*    (2020.01)
*B60W 30/12*    (2020.01)
(Continued)

(52) U.S. Cl.
CPC ........... *G01S 13/931* (2013.01); *B60W 30/08* (2013.01); *B60W 30/12* (2013.01); *G05D 1/021* (2013.01)

(58) Field of Classification Search
CPC ..... G01S 13/931; B60W 30/08; B60W 30/12; B60W 40/04; B60W 2050/146; B60W 2420/52; B60W 50/14; G05D 1/021
See application file for complete search history.

(56) References Cited

U.S. PATENT DOCUMENTS

| 4,129,397 A | 12/1978 | Eigenmann |
| 4,288,337 A | 9/1981 | Ota et al. |

(Continued)

FOREIGN PATENT DOCUMENTS

| CN | 102311674 A | * | 1/2012 |
| DE | 102016101156 A1 | * | 7/2017 |

(Continued)

OTHER PUBLICATIONS

Machine translation of DE-102016101156-A1, translated via Espacenet Jan. 7, 2021 (Year: 2021).*

(Continued)

*Primary Examiner* — Peter D Nolan
*Assistant Examiner* — Tanya C Sienko
(74) *Attorney, Agent, or Firm* — HONIGMAN LLP

(57) ABSTRACT

A vehicular radar sensing system includes a radar sensor disposed at the vehicle so as to have a field of sensing exterior of the vehicle. The radar sensor includes a plurality of transmitters that transmit radio signals and a plurality of receivers that receive radio signals. The received radio signals are transmitted radio signals that are reflected from from a radar reflective sign that is present along a road being traveled by the vehicle and in the field of sensing of the radar sensor. The radar reflective sign has radar reflective information. A control, via processing of outputs of the receivers by a processor, determines the radar reflective information. A display may display the determined radar reflective information for viewing by a driver of the vehicle. The control may control at least one guidance function of the vehicle responsive at least in part to the determined radar reflective information.

23 Claims, 11 Drawing Sheets

Related U.S. Application Data

(60) Provisional application No. 62/629,379, filed on Feb. 12, 2018.

(51) Int. Cl.
    *B60W 30/08*         (2012.01)
    *G05D 1/02*          (2020.01)

(56) References Cited

U.S. PATENT DOCUMENTS

| | | | |
|---|---|---|---|
| 6,414,606 B1 * | 7/2002 | Yujiri | E01F 9/30 340/904 |
| 6,690,354 B2 | 2/2004 | Sze | |
| 7,053,357 B2 | 5/2006 | Schwarte | |
| 7,212,663 B2 | 5/2007 | Tomasi | |
| 7,310,431 B2 | 12/2007 | Gokturk et al. | |
| 7,405,812 B1 | 7/2008 | Bamji | |
| 7,408,627 B2 | 8/2008 | Bamji et al. | |
| 8,013,780 B2 | 9/2011 | Lynam | |
| 8,027,029 B2 | 9/2011 | Lu et al. | |
| 8,694,236 B2 | 4/2014 | Takagi | |
| 9,036,026 B2 | 5/2015 | Dellantoni et al. | |
| 9,146,898 B2 | 9/2015 | Ihlenburg et al. | |
| 9,207,319 B2 * | 12/2015 | Starr | G01S 13/93 |
| 9,384,586 B1 | 7/2016 | McCusker et al. | |
| 9,575,160 B1 | 2/2017 | Davis et al. | |
| 9,599,702 B1 | 3/2017 | Bordes et al. | |
| 9,689,967 B1 | 6/2017 | Stark et al. | |
| 9,753,121 B1 | 9/2017 | Davis et al. | |
| 10,043,091 B2 | 8/2018 | Singh et al. | |
| 10,127,462 B1 * | 11/2018 | Pratt | G06V 20/588 |
| 11,112,498 B2 | 9/2021 | Miu | |
| 2003/0021930 A1 * | 1/2003 | Mientus | B29C 48/21 428/41.5 |
| 2003/0046021 A1 | 3/2003 | Lasky et al. | |
| 2003/0191568 A1 | 10/2003 | Breed | |
| 2008/0106436 A1 * | 5/2008 | Breed | G01S 17/86 340/905 |
| 2010/0245066 A1 | 9/2010 | Sarioglu et al. | |
| 2013/0009790 A1 * | 1/2013 | Serex | G08G 1/09623 340/905 |
| 2016/0017151 A1 | 1/2016 | Protzmann et al. | |
| 2017/0222311 A1 | 8/2017 | Hess et al. | |
| 2017/0254873 A1 | 9/2017 | Koravadi | |
| 2017/0276788 A1 | 9/2017 | Wodrich | |
| 2017/0293025 A1 * | 10/2017 | Davis | G01S 7/023 |
| 2017/0315231 A1 | 11/2017 | Wodrich | |
| 2017/0356994 A1 | 12/2017 | Wodrich et al. | |
| 2018/0015875 A1 | 1/2018 | May et al. | |
| 2018/0017799 A1 | 1/2018 | Ahmad et al. | |
| 2018/0045812 A1 | 2/2018 | Hess | |
| 2018/0231635 A1 | 8/2018 | Woehlte | |
| 2019/0146082 A1 * | 5/2019 | Cohen | H01Q 1/36 342/70 |
| 2019/0162839 A1 | 5/2019 | Weinmann et al. | |
| 2019/0339382 A1 | 11/2019 | Hess et al. | |

FOREIGN PATENT DOCUMENTS

| | | |
|---|---|---|
| DE | 102016101156 A1 | 7/2017 |
| GB | 2050769 B | 1/1981 |
| KR | 2018007087 | 1/2018 |

OTHER PUBLICATIONS

Machine translation of CN-102311674-A, translated via Espacenet Sep. 27, 2022 (Year: 2022).*

"Shot Blasting Material", flyer from Quality Spare Center, downloaded off www.archive.org , Jan. 30, 2018 scan. (Year: 2018).*

Snapshot of archive.org page for Wikipedia "Corner Reflector" Dec. 16, 2017 (Year: 2017).*

M. Donath, C. Shankwitz, and H. Lim, "A GPS-Based Head Up Display System for Driving Under Low Visibility Conditions", Mar. 2003, Final Report, Minnesota Dept. of Transportation (Year: 2003).

* cited by examiner

NORMAL DRIVING CONDITION : MARKINGS VISUALLY DISCERNABLE.

VIRTUAL DEMARCATIONS DISPLAYED
IN OVERLAP WITH ACTUAL LANE DEMARCATIONS

ADVANCED DRIVER-ASSISTANCE AND AUTONOMOUS VEHICLE RADAR AND MARKING SYSTEM

CROSS REFERENCE TO RELATED APPLICATIONS

The present application is a continuation of U.S. patent application Ser. No. 16/273,549, filed Feb. 12, 2019, now U.S. Pat. No. 11,112,498, which claims the filing benefits of U.S. provisional application Ser. No. 62/629,379, filed Feb. 12, 2018, which is hereby incorporated herein by reference in its entirety.

FIELD OF THE INVENTION

The present disclosure relates generally to an advanced driver-assistance and autonomous vehicle radar and marking system.

BACKGROUND OF THE INVENTION

This section provides background information related to the present disclosure which is not necessarily prior art. Motor vehicles are increasingly being equipped with sensors that detect the environment and terrain surrounding the motor vehicle. For example, some vehicles include sensor systems that provide images of the terrain and/or other objects in the vicinity of the vehicle. Sensing systems utilizing radar have also been used to detect the presence and position of objects near the motor vehicle while the vehicle is moving. The signals and data generated by these sensor systems can be used by other systems of the motor vehicle to provide safety features such as vehicle control, collision avoidance, self-driving autonomous capabilities, and parking assistance. Such sensing systems are generally used to assist the driver while he or she is driving the motor vehicle and/or to intervene in controlling the vehicle.

Typically these systems interact directly with the natural properties of the surrounding environment by emitting radar and receiving reflected radar waves from the environment surrounding the vehicle. One advantage with using radar, as opposed to visible light, is radar's ability to be transmitted through and penetrate objects and materials without or with limited degradation of the reflected and received radar signal. For example, conventional road markings, such as paint or preformed thermoplastic film can be covered by snow or heavy rain thereby obscuring them to a driver of the vehicle. These conventional road markings are typically applied on top of the road surface and need to be reapplied regularly. Systems employing cameras in many conditions are not able to overcome such reductions in visibility and assist the driver with discerning these markings, nor can these system be employed to enable level 3 to lever 4 autonomous vehicles.

Further drawbacks to these radar system exist. One further drawback is that these systems require complex signal processing and computer implemented algorithms to decipher the reflected radar signals to learn and capture information about the environment around the vehicle which can be useful to the driver and an autonomous vehicles control system for driving and/or controlling the vehicle. Another drawback is that received radar signals only contain information about the inherent properties of the objects in the environment, and cannot contain enhanced information that can be easily and quickly processed by the vehicle radar system to capture digital information and descriptions about the environment or object.

Thus, there is an increasing need for improved sensor systems and methods that enhance the operation of a vehicle, such as an autonomous vehicle, and also enhance the visibility of the driver in certain environmental conditions, such as rain and snow where the driver is unable to view the road ahead of him to thereby improve safety and vehicular control. Furthermore, other desirable features and characteristics of the present disclosure will become apparent from the subsequent detailed description and the appended claims, taken in conjunction with the accompanying drawings and the foregoing technical field and background.

SUMMARY OF THE INVENTION

This section provides a general summary of the present disclosure and is not intended to be interpreted as a comprehensive disclosure of its full scope or all of its features, aspects and objectives. In accordance with an aspect of the present disclosure, an advanced driver-assistance and autonomous vehicle control radar and marking system and method thereof is provided. The advanced driver-assistance and autonomous vehicle control radar and marking system and an associated method allows for improving road visibility using radar technology assisting a driver or autonomous vehicle system to more clearly differentiate the surrounding environment either during normal driving conditions (e.g., during day light or night operation) or during difficult driving conditions that cause loss of visibility for a driver or a vehicle system. For example, driving conditions may be difficult during white out conditions due to snow, loss of headlight operation during night driving due to heavy rain, fog, and other situations where a driver cannot visually see the road and lane markings when driving. The system may need to detect objects and markings to render the proper decisions about the control of the vehicle employing, for example, optics, in order to be able to maintain the vehicle on the road and avoid an accident, collision, or going off the road.

According to another aspect of the disclosure, there is provided a radar based system and method for providing feedback to the driver of the road using radar signals transmitted from the vehicle and radar reflected from objects and markings on the road and surrounding environment, such as signs or the like, and having them visually displayed to the driver in lieu of or in addition to visual road markings. According to another aspect of the disclosure, a system and method is provided that employs a radar based sensor for providing feedback to the driver of the road using signals from radar transmitted from the vehicle and radar reflected from objects and markings on the road and surrounding environment, such as signs of the like, for controlling the autonomous driving of the vehicle.

According to another aspect of the disclosure, a system and method is provided that employs a radar based sensor for providing information to one of the driver or an autonomous vehicle control system road using encoded messages embedded into road markings or other display signs using radar reflective material deployed in an encoded and decoded manner. The system or method further provides transmitting from the vehicle radar signals and receiving at the vehicle the radar reflected from objects and markings on the road and surrounding environment, such as signs or the like, and providing a controller to subsequently decode the messages detected by the radar receiver for controlling the vehicle and the vehicle systems responsible for vehicle trajectory, or informing the driver of the messages as decoded by the system.

These and other aspects and areas of applicability will become apparent from the description provided herein. The description and specific examples in this summary are intended for purpose of illustration only and are not intended to limit the scope of the present disclosure.

The drawings described herein are for illustrative purposes only of selected embodiments and not all implementations, and are not intended to limit the present disclosure to only that actually shown.

DESCRIPTION OF THE PREFERRED EMBODIMENTS

In the following description, details are set forth to provide an understanding of the present disclosure. In some instances, certain circuits, structures, steps, and techniques have not been described or shown in detail in order not to obscure the disclosure. Referring to the Figures, wherein like numerals indicate corresponding parts throughout the several views, an advanced driver-assistance and autonomous vehicle control radar system 20 for a motor vehicle 22 is disclosed.

Figure 1:
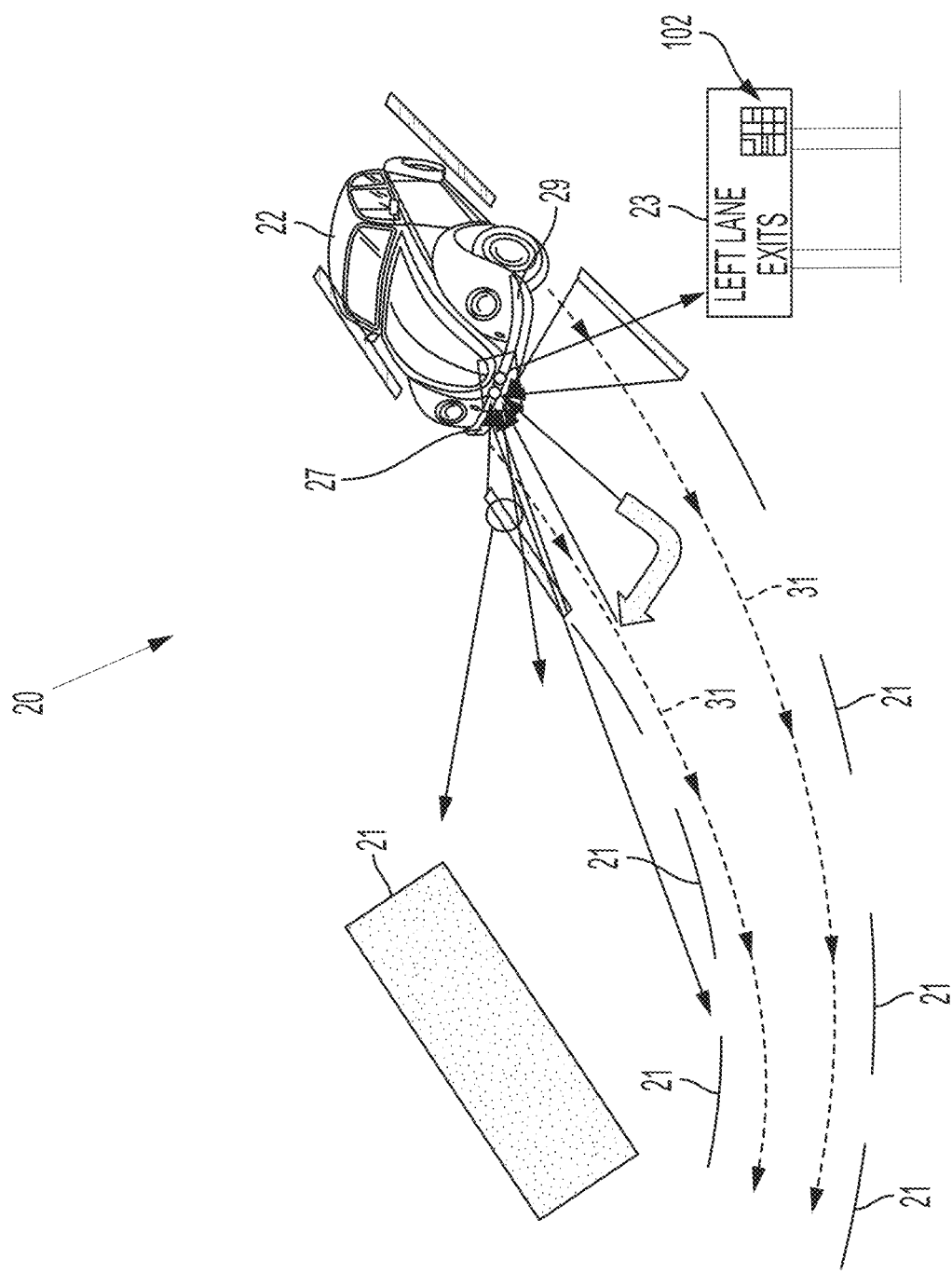
FIG. 1 is a perspective view of a vehicle with a sensing system that incorporates a radar sensor to detect radar reflective objects in accordance with the present invention.
Figure 2:
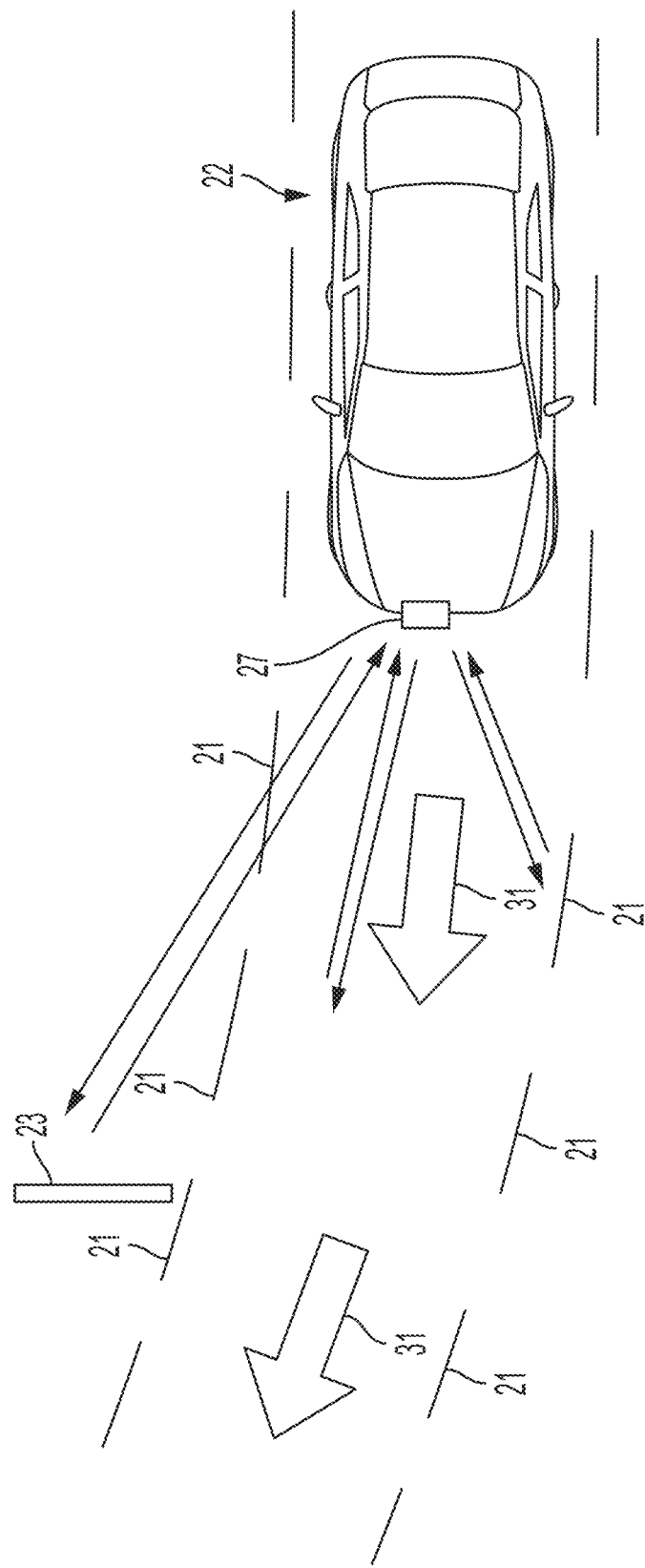
FIG. 2 is a plan view of the vehicle and sensing system of FIG. 1.
Figure 3:
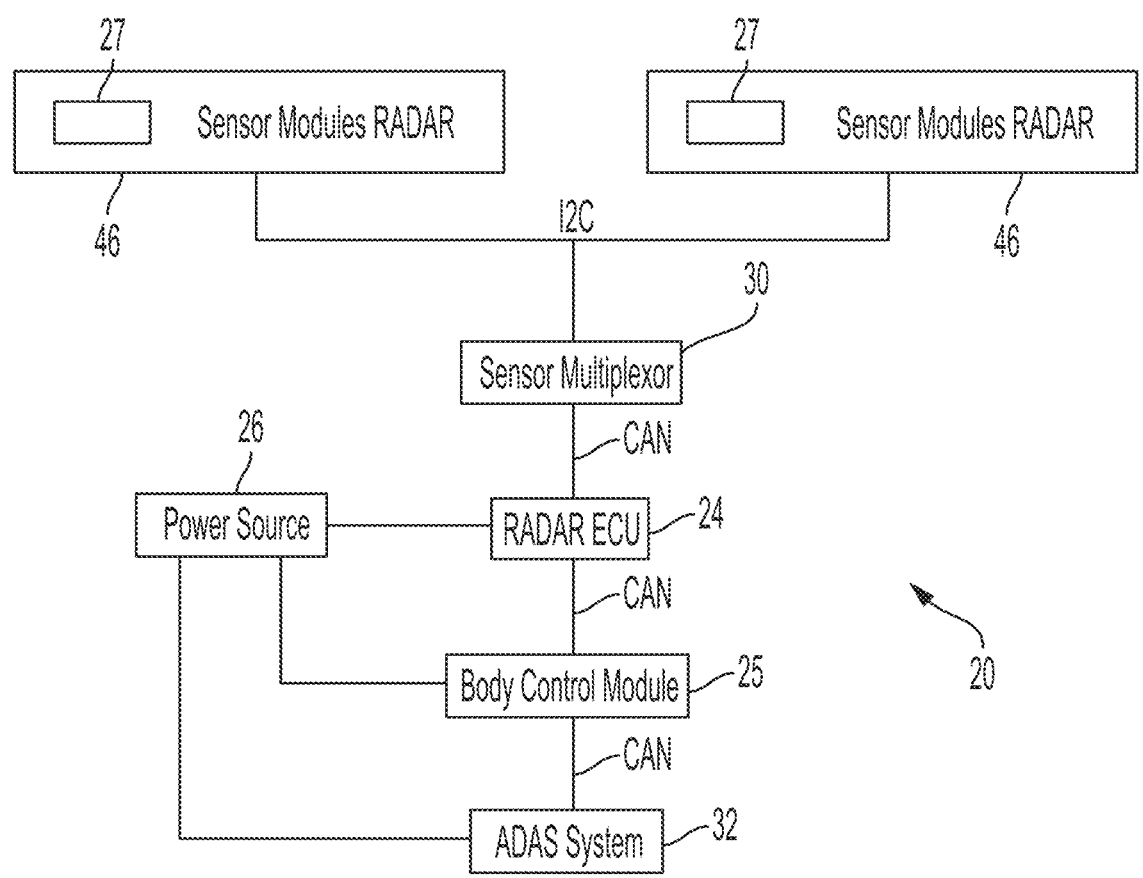
FIG. 3 is a block diagram of the sensing system of FIG. 1.

As best shown in FIGS. 1-3, the advanced driver-assistance and autonomous vehicle control radar system 20 includes a main electronic control unit 24 that is adapted to connect to a power source 26 and to a vehicle CAN bus (controller area network). The advanced driver-assistance and autonomous vehicle control radar system 20 enables level 4 and 5 autonomous vehicle implementation due to its capability to provide reliable and weather independent environmental sensing. One drawback of current camera or optical based vehicle guidance system for enabling level 4 and 5 autonomous vehicle implementation is their ineffectiveness in inclement weather such as heavy rain, low visibility, or snow covered roads. Road mapping and GPS based systems are also prone to false readings (GPS signals are inexistent or too weak in mountainous regions, tunnels etc.), are low accuracy (GPS accuracy is only about 3 meters, and thus insufficient for lane maintaining vehicle control applications) as well as unable to recognize mapped landmarks in certain conditions (such as heavy snow) or adapt to changing condition (e.g., road construction).

The advanced driver-assistance and autonomous vehicle control radar system 20 overcomes these drawbacks by making use of microwave radiation (MW, with radar technology being a subset of MW) or radio frequency (RF) technology. As illustrated herein, the advanced driver-assistance and autonomous vehicle control radar system 20 will be described in the context of employing radar, without precluding the employment and benefits of other types of radiation. The advanced driver-assistance and autonomous vehicle control radar system 20 includes at least one radiation emitter and receiver mounted on the vehicle 22 in a forward facing direction and further includes reflective road markings 21 enhanced with radar reflective materials, as well as RF/MW readable road signs enhanced with radar reflective materials. With the advent of radar on chip electronics, this technology can be applied to vehicles in a cost effective manner.

By using waves in the MW and RF frequencies, the road markings 21 and roadside signs 23 can be "seen" through inclement weather as they can penetrate thru fog, snow, etc. Still referring to FIG. 1, the advanced driver-assistance and autonomous (ADAS) vehicle control radar system 20 includes a vehicle mounted radar sensor 27, illustratively mounted to the front bumper 29 of the vehicle 22 in a forward facing manner to the trajectory 31 of the vehicle 22. The advanced driver-assistance and autonomous (ADAS) vehicle control radar system 20 may include either one or more microwave transmitter 200 and receiver 202, and one or more radio frequency (RF) transmitter and receiver, or a combination of microwave and radio frequency transmitter and receivers. The transmitters 200 emit radiation generally towards the front and sides of the vehicle 22 and the receivers 202 read/detect the radiation reflected back off of the road markings 21 and roadside signs 23 to the vehicle 22. The reflections are then processed numerically by the radar ECU 24 and information about the environment e.g. the location/distance/intensity/velocity of approach/angle of approach etc. of the road markings 21 and/or the information being communication by the road signs 23 is extracted and used by the vehicle 22 for ADAS or autonomous navigation, and/or for enhancing driver information and visibility of the road environment in the course of the vehicle trajectory.

Although an abundance of information about the environment can be gathered by the vehicle 22 using the advanced driver-assistance and autonomous (ADAS) vehicle control radar system 20, the system 20 may be preferably configured to detect lane demarcations typically formed as a series of left and right discontinuous lines, and roadside signs in a manner as will be described herein. For example, the radar system 20 may determine, based on the detected lane demarcations, a position of the equipped vehicle within the lane and/or which lane of a plurality of lanes the vehicle is travelling in. Referring back to FIG. 3, a sensor 27, in some implementations, is coupled to a main electronic control unit 24 via a sensor multiplexor 30 for receiving power to the sensor 27 and for facilitating communication with the main electronic control unit 24 and the sensor 27 over the CAN communication bus. The vehicle 22 may be equipped with an autonomous vehicle controller 44 also coupled in communication to the main electronic control unit 24 (e.g., for providing the autonomous vehicle controller 44 with radar sensor information and data collected from the environment as will be described below).

The autonomous vehicle controller 44 is in communication with the various vehicle system control operating the functions that drive the vehicle and control its trajectory, which may include either directly or indirectly through the BCM 25, or, in some cases, bypassing the BCM 25 when possible. Such functions may include, brake systems, throttle systems, steering systems, visual indicator systems, and/or other sensory systems, and so forth and so on. Generally, the advanced driver-assistance and autonomous (ADAS) vehicle control radar system 20 uses forward looking radar to compare the vehicle path 270 to the lane as demarcated by the road markings 21 forming lane markings on left and right hands sides of the vehicle 22. To this end information extracted from the received reflected radiation signals may include angle, intensity of the reflections, distance/range, as well as velocity. For example, processing the information may include comparing the road markings 21 to the vehicle path 270 and determining if the vehicle path 270 is approaching the road markings 21. Another method may including forward looking at a certain distance or range to determine if the vehicle path 270 changes as compared than a linear vehicle path 270 in anticipation of a requirement change in the vehicle path 270 (e.g., when there is a curve ahead in the road, what is the rate of change in the curve, is there an off ramp, is there a reducing or increase in the number of lanes etc.). In such existing systems, as the vehicle passes over the road marking, two radio transmitter/receiver pairs measure the distance from the sides of the vehicle to the radio reflective marking in the center of the lane.

Still referring to FIG. 3, while the main electronic control unit 24 is illustratively described hereinabove as being in communication with a radar sensor assembly 36 over the vehicle CAN bus 28, the main electronic control unit 24 may alternatively be in direct communication with the radar sensors 27 and may be integrated with in the radar sensor assembly 36 and be in communication with the Body Control Module (BCM) 25 over the vehicle CAN bus 28. Also, the main electronic control unit 24 may alternatively be coupled to the BCM 25 for forwarding to the BCM 25 a request for a desired vehicle operation based on the radar data, or simply forward the radar data about vehicle path 270 based on the detected lanes as demarcated by the road markings 21 or otherwise data about a detection of an encoded message from the environment as will be described below, (e.g., the main electronic control unit 24 may issue a request or suggestion for controlling the vehicle 22, for example steering based on detection of a lane deviation based on the detected lane versus the actual trajectory of the vehicle, i.e. veering towards on the road markings 21 on the left side of the vehicle). The main electronic control unit 24 may forward data about the detected lane markings to the ADAS system 32 which may in turn operate the motor vehicle (i.e., provide or generate instructions to control the various vehicle systems) based on the received information and data from the sensor 27, as well as in consideration with other decision criteria (e.g., decoded messages embedded in the markings detected by the sensors 27) as will be described in more detail below. Optionally, or additionally, the main electronic control unit 24 may forward information about the messages encoded in the road markings 21 and/or signs 23 to be processed by the BCM 25 or ADAS system 32.

Figure 4:
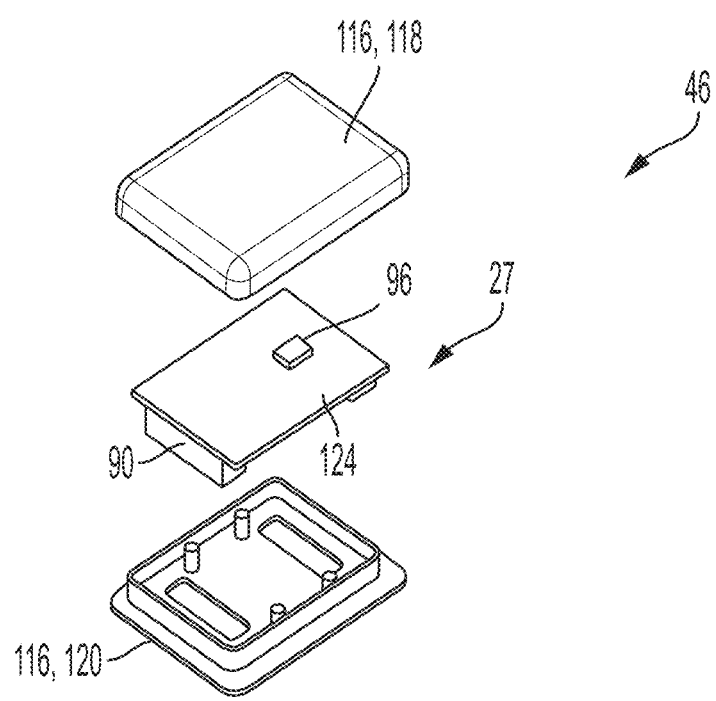
FIG. 4 is an exploded perspective view of a sensor assembly of a sensing system in accordance with the present invention.
Figure 5:
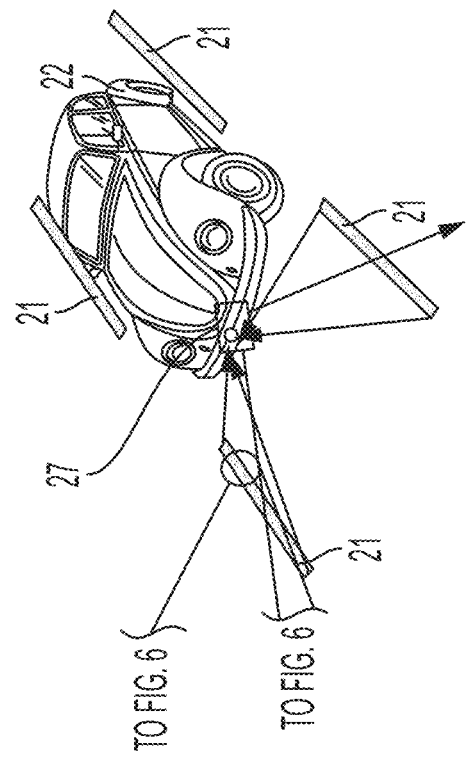
FIGS. 5 and 6 are perspective views of another vehicle and sensing system that incorporates a radar sensor to detect radar reflective objects that include barcodes in accordance with the present invention.

As best shown in FIG. 4, each of the sensor assemblies 46 housing a radar sensor 27 may include a housing assembly 116 that comprises a housing top 118 and a housing bottom 120, each made of plastic (e.g., polypropylene and/or acrylonitrile butadiene styrene). Because radiation from such a sensor can penetrate the housing assembly 116 made from plastic, openings for a direct line of sight are not required. A sensor printed circuit board 124 includes a sensor integrated circuit (IC) 96 and connector 90. The sensor IC 96 includes one or more radar transmit and receive antennas integrated into the radar sensor IC 96. The sensor IC 96 is attached to the PCB 124 as well as a plurality of wiring harness connectors (e.g., CAN bus connector, power connector) and is disposed within the housing assembly 116. The housing bottom 120 may include one or more apertures to accommodate the connectors. While such a specific structure may be utilized, it should be understood that radar sensor assembly 46 and sensors 27 may take other forms. The sensor 27 may be configured to transmit and detect radio waves, for example radar waves.

Figure 7C:
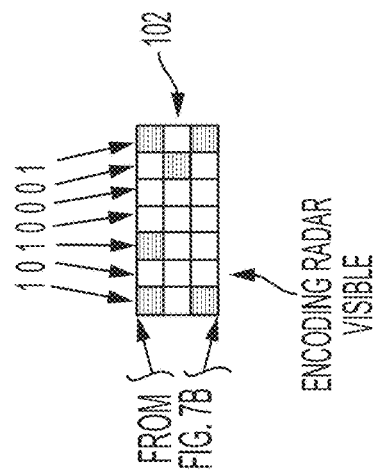
FIGS. 7A-7C are perspective views of a vehicle and sensing system that incorporates a radar sensor to detect radar reflective road signs that include two-dimensional barcodes in accordance with the present invention.
Figure 7B:
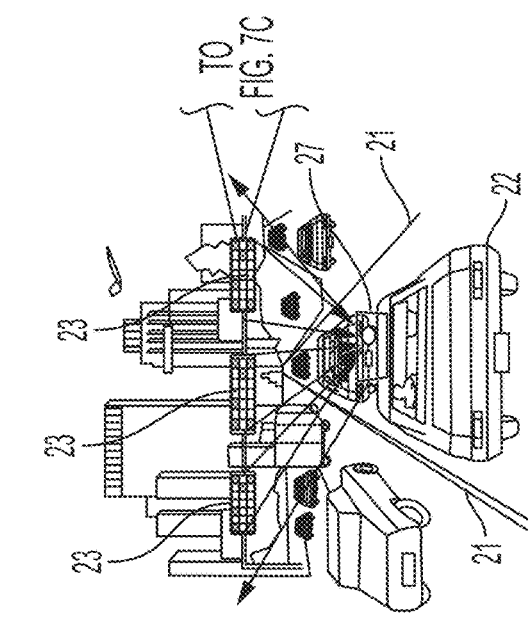
Figure 7A:
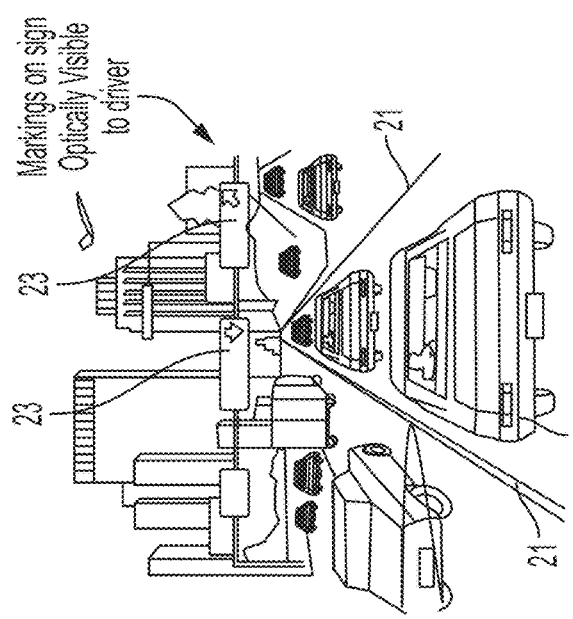
Figure 8:
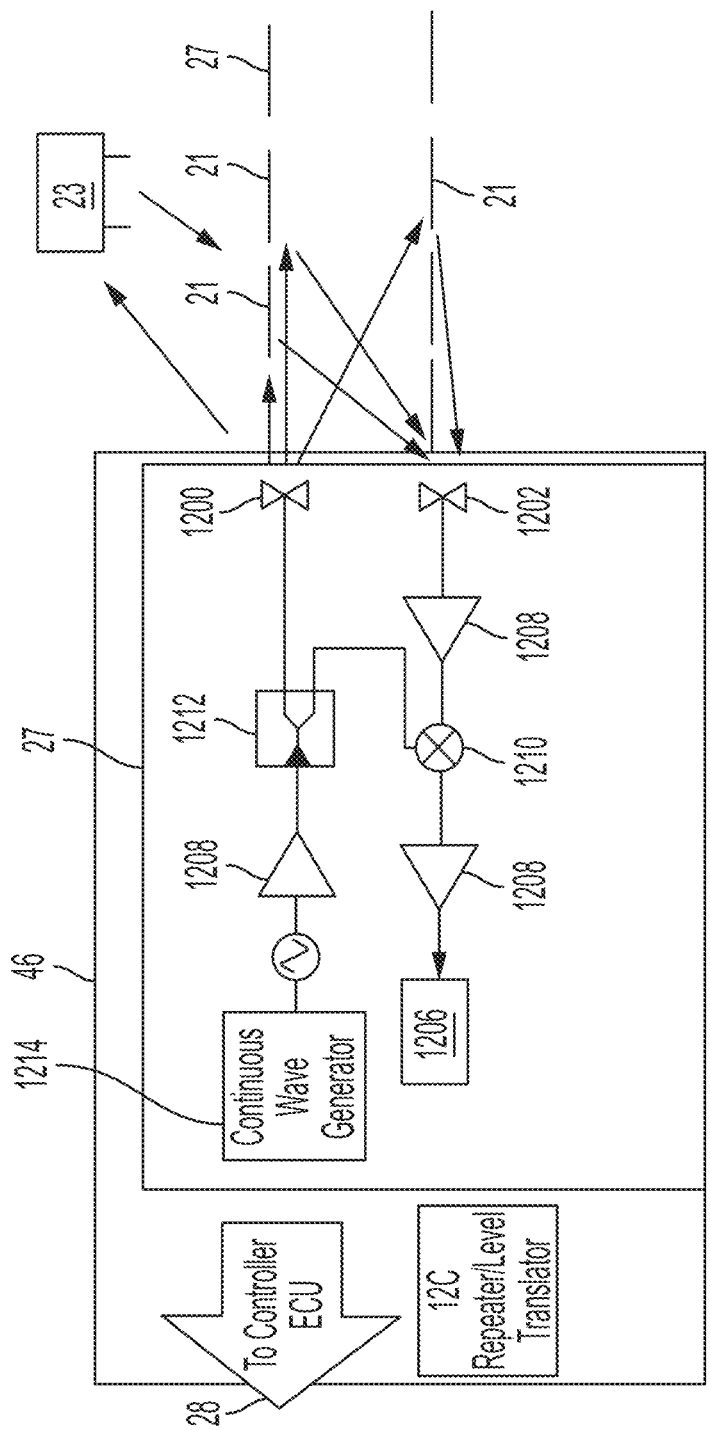
FIG. 8 is a block diagram of a continuous wave (CW) radar sensor assembly.
Figure 9:
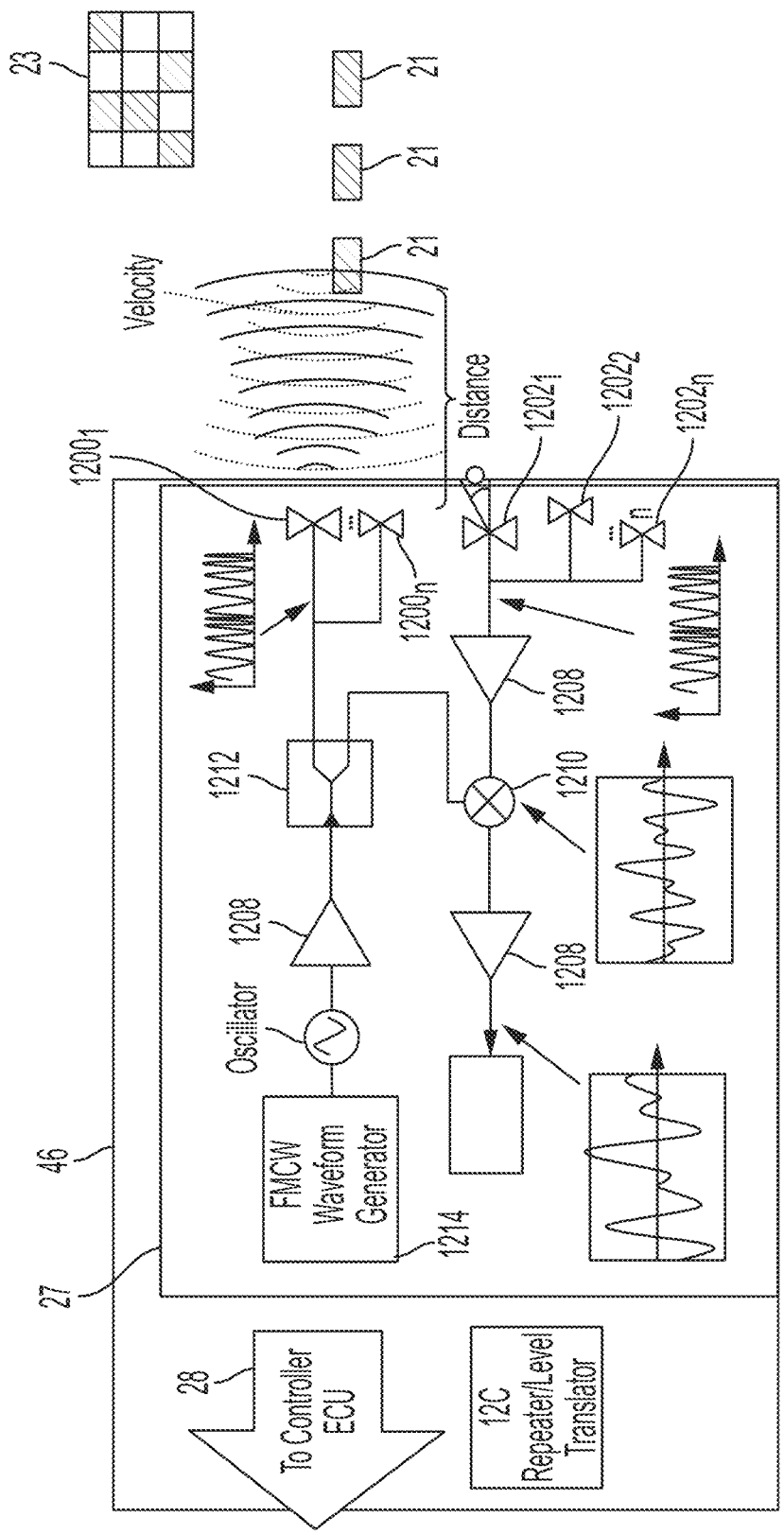
FIG. 9 is a block diagram of a frequency modulated continuous wave (FMCW) radar sensor assembly.

With reference to FIGS. 7-9, the sensor 27 may be configured to emit continuously modulated radiation, ultra-wideband radiation, or sub-millimeter-frequency radiation (e.g., frequencies forming part of the ISM frequency band about 24 GHz or the 60 GHz frequency band, but other frequency ranges are also contemplated). For example, and with reference to FIG. 8 the sensor 27 may be configured to emit continuously emitted radiation by the radar emitting element 1200, such as an antenna, or continuous wave (CW) radar. Known Doppler radar techniques may be employed by the sensor 27 for the advanced driver-assistance and autonomous vehicle control radar system 20 as illustrated FIG. 1. Modulated emitted radiation by the radar emitting element 1200 or frequency modulated continuous wave (FMCW) radar, using, for example, Doppler radar techniques, may also be employed in the advanced driver-assistance and autonomous vehicle control radar system 20 as illustrated in FIG. 9. Additionally, the sensor 27 may be configured for pulsed time-of-flight (ToF) radar.

The sensor 27 includes one or more receive elements 1202 (e.g., antennae) for receiving the reflections of the transmitted radar waves (i.e., from radar emitting element 1200) which reflect off of the enhanced road markings 21 and/or signs 23 and return to the receive elements 1202. The radar emitting element 1200 may be integrated into the sensor printed circuit board 124 or integrated into a radar chip affixed to the sensor printed circuit board 124. The sensor 27 may be configured to emit and detect continuous wave (CW) radar, as is illustratively shown in FIG. 8 with the sensor 27 including one transmit antenna 1200 and one receive antenna 1202. With such a configuration, the sensor 27 is operable to detect a speed/velocity of approach and intensity of reflections off the enhanced road markings 21 and/or road signs 23 to the vehicle 22 using the Doppler Radar principles. That is, processing by the main electronic control unit 24 or a dedicated local application specific radar signal processor 1206 the received reflected CW radar signal to determine frequency shifts of an emitted continuous radiation wave indicative of the speed of approach of the road markings 21 and/or signs 23.

The sensor 27 may also be configured to emit frequency modulated continuous wave (FMCW) radar, as is illustratively shown in FIG. 9, with the sensor 27 including one transmit antenna 1200 and one receive antenna 1202. With such a configuration, the advanced driver-assistance and autonomous vehicle control radar system 20 is operable to detect the road markings 21 and/or signs 23 using Frequency Modulated Radar techniques. Such detection is made via processing by a signal processor 1206 or main electronic control unit 24 of the reflected FMCW radar signal to determine frequency shifts indicative of the speed (Doppler frequency) and distance (beat frequency) and intensity of reflections, as well as the angle of reflections, of the road markings 21 and/or signs 23. In some implementations, the FMCW radar system is configured to include at least two receive antennas 12021, 12022, to 1202n optionally offset from another for forming an antenna array. Also, multiple transmit antennas 1200n may be provided.

The signal processor 1204 is illustrated as in communication with the antenna element(s) 1201 through signal processing elements such as high/low gain signal amplifiers 1208 and a mixer 1210. The mixer 1210 is configured to mix the received signal with the transmitted signal generated by a waveform generator 1214 as received from a splitter 1212 for processing the received reflections. That is, the signal processor 1206 or main electronic control unit 24 may be configured to execute instructions stored in memory to perform calculations on the received reflection and transmitted radiation signals (i.e., mixed signals) to implement the various detection techniques or algorithms (e.g., CW Radar, FMCW Radar, time of flight) within the intermediate radar field to provide data for location, positions, range, distance of the road markings 21 and/or signs 23, the distance from the vehicle 22 of the road markings 21 and/or signs 23, the radar reflective intensity differences between the road markings 21 and/or signs 23, and the surrounding environment or intensity differences within each of the road markings 21 and/or signs 23. For example, the signal processor 1206 or main electronic control unit 24 may be configured to process the received reflection to identify the lanes as determined by the reflectance of the road markings 21 and compare these lane markings with the trajectory of the vehicle 20 as it approaches the road markings 21 to determine if any trajectory corrections of the vehicle 22 are required to maintain the vehicle 22 within the lane.

Figure 12B:
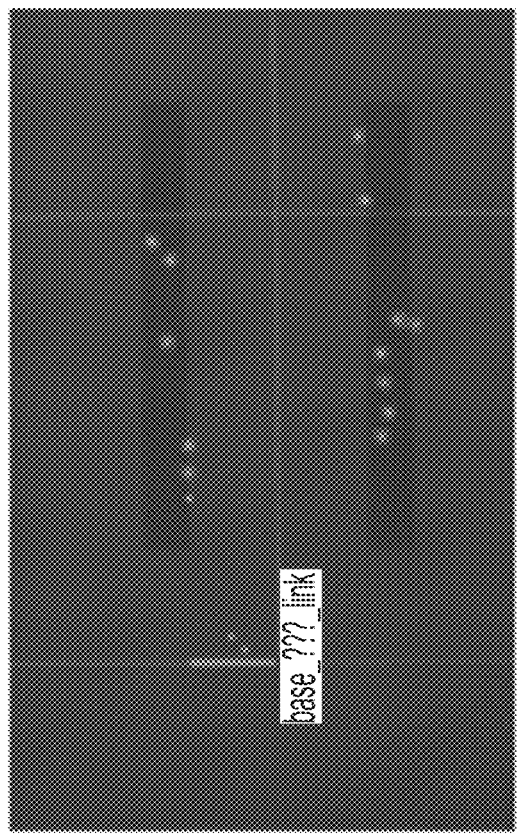
FIGS. 12A and 12B are schematic views of painted demarcation lines and the detection of grit within the paint in accordance with the present invention.
Figure 12A:
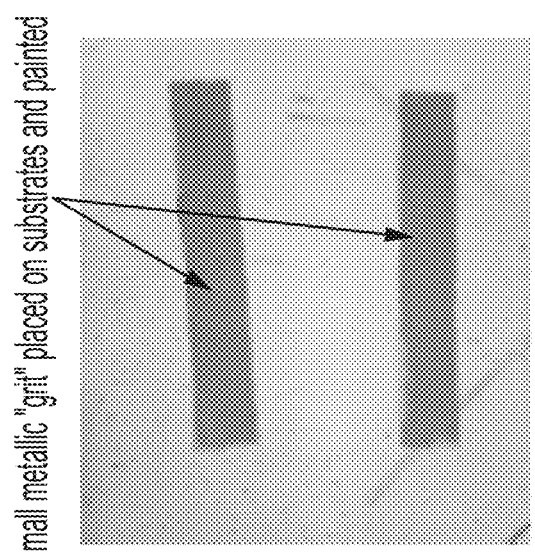

In one embodiment, the road markings 21 (e.g., lane demarcations, pedestrian crossing, one way arrows, etc.) are displayed on the road surface using paint enhanced with radar reflective properties for increasing reflectivity relative to the surrounding environment (e.g., pavement) and for increasing the intensity of the reflections detected by receiver 1202. Such paint may preferably include distributed therein iron or iron based alloy particles, while aluminum, magnesium, zinc or their alloys may be less preferable. In order to maximize radar wave scattering back to the vehicle and back to the receiver 1202, the particles are preferably multifaceted, sharp cornered particles (e.g., a metal grit). The particles may also be flat pieces referred to as flakes. Other shapes, such as spherical, oval or rounded (commonly referred to as shot) may not be preferable. Multifaceted, sharp cornered particles may be preferable because such corners and edges generally maximize radar wave scattering back to the vehicle 22 and the receiver 1202. For example, as illustrated in FIG. 12A, small metallic grit may be placed on a substrate and painted. Then referring to FIG. 12B, the radar system 20 may detect the metallic grit (i.e., the red dots) from the reflected radar signals from the substrates containing the metallic grit.

In another embodiment, the road markings 21 are formed using a prefabricated tape, such as a preformed thermoplastic film, which can be affixed to the road surface by pre-heating (e.g., melting) the road surface and pressing the tape on, or by providing the tape with adhesive properties. The paint or material for forming the road markings 21 may optionally include glass beads as well as other light reflecting materials may be employed for augmenting visual recognition of the road markings 21. The coarseness of the paint will not require extra friction enhancing additives due to the addition of the radar reflective particles because the radar reflective particles naturally provide the desired extra friction enhancing properties typically provided by the additives. It is preferred that the particles are mixed or covered in the base material as extra protection and increased durability. Advantageously, such enhanced paint for forming road markings 21 is typically applied for visual markings during a painting process of the signs on the road surface as typically known in the art (e.g., by using a paint gun) and as a result no extra step other than substituting the road paint with the enhanced road paint described herein is required for preparing the vehicle environment of the advanced driver-assistance and autonomous (ADAS) vehicle control radar system 20.

Figure 6:
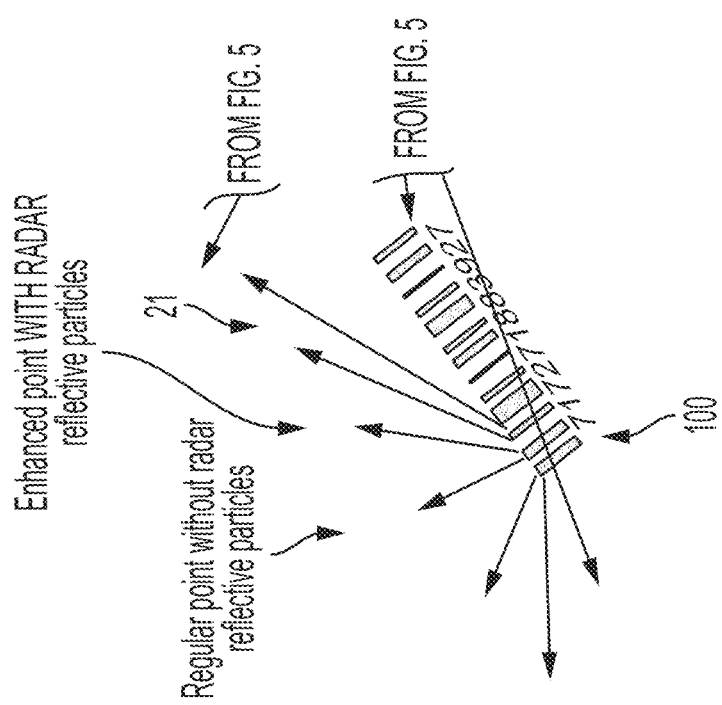

The use of radar reflective paint for the road markings 21 has the effect that it can be "seen" by advanced driver-assistance and autonomous vehicle control radar system 20, which is useful when the driver cannot visually see the light reflected off of the road markings 21, which may occur under situations of heavy rain, heavy fog, and heavy snow, or when headlights are not available to illuminate the road way. By also applying the MW/RF reflective material selectively within the paint, information may be embedded in the road markings 21 that the information may be read by the advanced driver-assistance and autonomous (ADAS) vehicle control radar system 20. Such embedded information may be in the form of a linear barcode 100 within the lane demarcation as illustrated in FIG. 6.

Although it is possible to read existing road markings 21 using MW/RF radiation naturally occurring in the environment, it requires highly sensitive devices forming a passive detection system which are generally cost and size prohibitive to use on road going vehicles. By increasing the contrast between the road markings 21 and background (such as the asphalt forming the road surface, or from the prior art non-radar reflective road paint) via the paint with the radar reflective particles as described hereinabove, smaller and less expensive transmitter/receivers can be used as part of an active system. One way to increase the contrast is to make the road markings more reflective to the incident radiation than the road surface as described above. Since both MW and RF frequencies are reflected by metal, metallic pieces may be embedded either in the road marking paint (or polymer or preformed strip) or even within/below/partially below the road surface. Employing rather flat strips of metal parallel to the road surface would reflect the signal away from the vehicle, however the use of multifaceted particles such as steel grit to create surfaces that would reflect the waves back towards the vehicle as described hereinabove will promote reflection back to the vehicle 22. Other variants include, but are not limited to, using metamaterial lenses to reflect the waves, for example using Eaton lenses to bend the wave back to its source. Manufactured markers may also be used (e.g., corner reflectors, cats-eyes, either randomly or purposely oriented). Additionally, microwave identification (MWID) and/or radio-frequency identification (RFID) tags, either passive or active, may be embedded in the road markings 21 or the road surface.

In another embodiment, road signs 23 (i.e., a road side sign such as speed information, street name, one way street, etc.) may include markings, such as text, symbols, arrows, or the like, which are composed of MW and/or RF reflective material strategically deposited onto the road sign 23 to further assist vehicle guidance. Such a road sign 23 may be formed using typical paint to form the text, symbols, arrows, or the like where the visible signage (i.e., visible to a human driver) that is radar non-reflective or transparent is printed over an encoded layer. The encode layer may be formed from a sequence of radar reflective material and non-radar reflective material to form an encoded sequence, for example a two-dimensional or Quick Response (QR) code 102.

The QR code 102 represents the same information as the optically visible marking, but may be read by the vehicle sensors 27 through inclement weather even when visually it is not apparent what the road sign 23 displays (i.e., the sign may be covered by snow rendering the marking unreadable to a driver), but which is discernable either directly or through decoding by the advanced driver-assistance and autonomous vehicle control radar system 20. For example, the information representative of the markings of the road sign 23 may be encoded in a binary format embedded in a layer below the layer of normal non-radar reflective paint deposited to form the text, symbols, arrows, or the like.

Optionally, the text, symbols, arrows, or the like may be deposited as one layer, with the paint being enhanced with the radar reflective particles as described hereinabove. The substrate of the road sign 23 may be made of a sandwiched material such as a continuous fiberglass sheet and a perforated aluminum layer. The aluminum layer may be perforated in such a way as to contain information in a way similar to a QR code. The sandwich panel is then painted with the visible information. The advanced driver-assistance and autonomous (ADAS) vehicle control radar system 20 can thereby "read" the waves that reflect back from the sign, with the differences in intensities as a result of the differences between the radar reflective and non-radar reflection portions of the sign 23 being translated into a map of the sign 23. The reflective areas are read as one state of the binary bit (i.e., a '0' or a '1') and the non-reflective areas as the other. The binary sequence is read as a digital signature of the sign and together with the distance to the sign, used by the vehicle for ADAS or autonomous navigation.

Although the above embodiment is preferred, a second embodiment uses either passive or active MWID/RFID tags attached to the sign. Roadside signs made of selective radar reflective material (i.e., a road side sign such as speed information, street name, one way street, etc.) where the visible signage is printed on a panel that looks like a QR code to the radar and contains the same information but can be read by the radar through inclement weather (e.g., covered by snow) is shown in FIGS. 7A to 7C.

Thus, the present invention includes creating particles that may reflect RF waves and when the particles are applied to road markings and traffic signs, the signs may be more easily detected by a radar system. This enables detection through materials like snow, fog, and heavy rain. Additionally, the particles may be applied to road markings, such as lane demarcations, pedestrian crossings, one way arrows, etc., that may then be "seen" by the radar system. By also applying the radar reflective material selectively within the paint or within the road surface demarcations, information may be embedded that may be read by the radar, such as a linear barcode within the lane demarcation. The barcode like radar visible patterns embedded within lane demarcation paint or below or partially below the road surface may contain information to enhance vehicle guidance (e.g., pedestrian crossing ahead, which lane the vehicle is travelling in out of plurality of lanes, carpool lanes, school zones, restrictions on passing, etc.). When MWID/RFID tags are used, the same data may be read from the signal pinged back from the tag. The road markings 21 and/or signs 23 are therefore visible through snow, rain, ice, etc. The advanced driver-assistance and autonomous (ADAS) vehicle control radar system 20 enables level 3 to 5 autonomous vehicles. The radar reflective material may also be applied belong the road surface, without any distracting effect to a driver during normal driving and visible conditions, because the embedded information is integrated into existing painted road markings.

The road markings 21 and/or signs 23 may be augmented to contain extra information aside from the simple road marking visible to a driver under normal driving conditions. Such information may include barcode type information within the lane demarcations lines, which may be encoded with extra information such as, for example, distances to an upcoming stop sign, a lane number the equipped vehicle is travelling in, an indication that an upcoming pedestrian crossing is approaching ahead, an indication that an emergency shoulder is available adjacent the lane, and the width of the emergency shoulder. The system 20 may decode and provide the information to the autonomous vehicle controller 44 for making vehicle control decisions, such as stopping in a determined distance, turning into and stopping within an emergency shoulder area, etc. Such decoded information may also be forwarded to a vehicle system for alerting the driver as to the information decoded, either through an audible system, for example a recital of the information to the driver through the internal vehicle speaker system, or a visual indication of the information, for example by a heads-up display or other type of display device. The decoded information may also be transmitted to another vehicle or structure (e.g., through vehicle-to-vehicle (V2V) communication or vehicle-to-infrastructure (V2X) communication).

Figure 10:
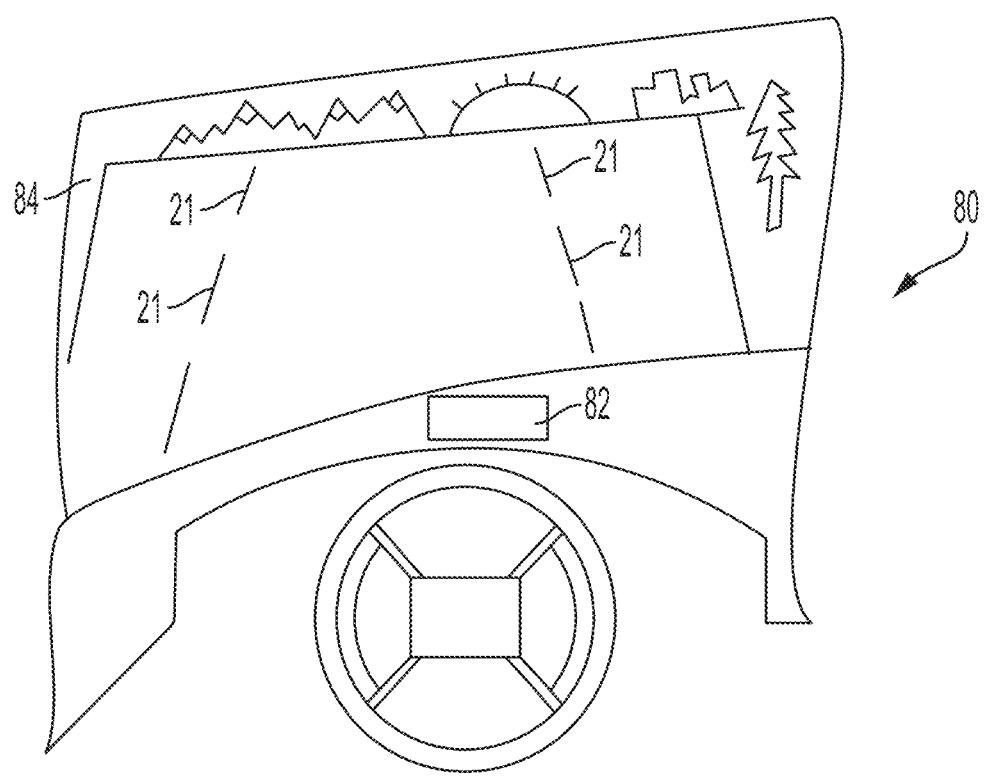
FIG. 10 is a plan view of a sensing system that includes a heads-up-display in accordance with the present invention.
Figure 11:
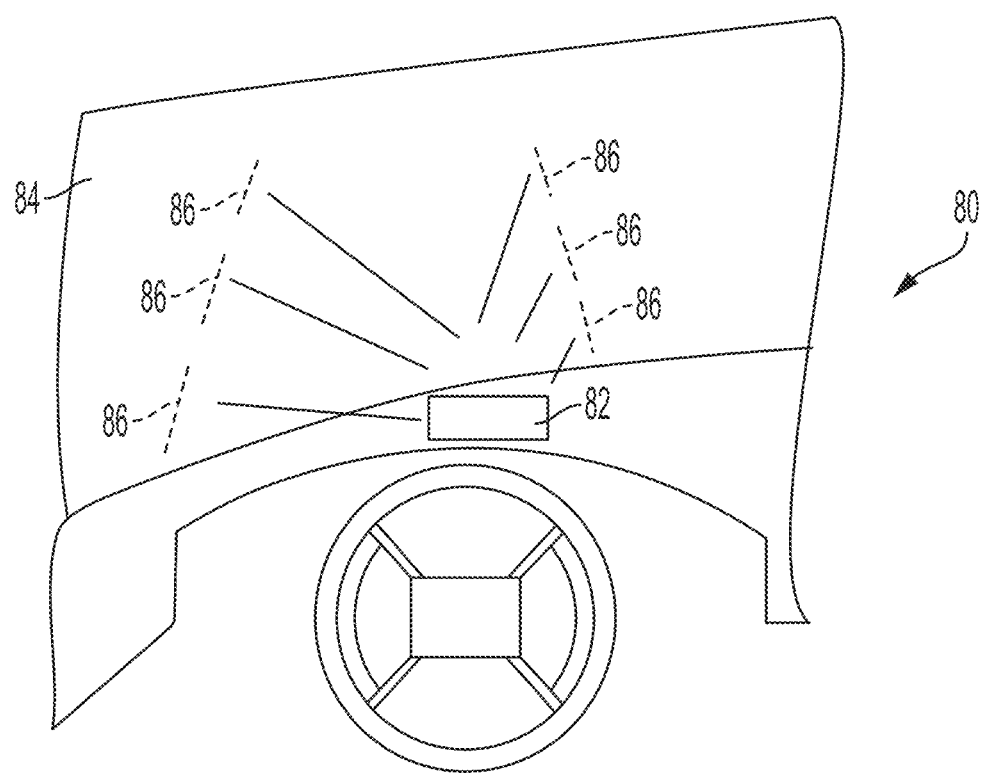
FIG. 11 is another view of the sensing system of FIG. 10, shown with virtual lane demarcations in accordance with the present invention.

Now referring to FIGS. 10 and 11, a heads-up-display 80 for driver assistance is illustrated. The heads-up-display includes a display device 82 used to display information on the windshield 84. The display device is in communication with the radar ECU 24 and may process data received by the sensors 27 and display the information on the windshield 84. For example, the heads-up-display may display the virtual lane demarcations 86 in a manner that would overlap the actual lane demarcations that are visible to the driver under normal driver conditions. When visibility of the lane demarcations is not possible, the virtual markings 86 to inform the driver of the actual lane demarcations.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure. Those skilled in the art will recognize that concepts disclosed in association with an example system can likewise be implemented into many other systems to control one or more operations and/or functions. Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The invention claimed is:

1. A vehicular radar sensing system, the vehicular radar sensing system comprising:
   a radar sensor disposed at a vehicle equipped with the vehicular radar sensing system, the radar sensor having a field of sensing exterior of the vehicle;
   wherein the radar sensor comprises a plurality of transmitters that transmit radio signals and a plurality of receivers that receive radio signals, and wherein the received radio signals are transmitted radio signals that are reflected from a radar reflective sign that is present along a road being traveled by the vehicle and in the field of sensing of the radar sensor;
   a control having a processor for processing outputs of the receivers;
   wherein the radar reflective sign comprises radar reflective information, and wherein the radar reflective information comprises information not visually present on the radar reflective sign, and wherein the information not visually present on the radar reflective sign comprises at least one selected from the group consisting of (i) a distance, (ii) an indication of a pedestrian crossing and (iii) an indication of an emergency shoulder;
   wherein the control, responsive to processing of the outputs of the receivers by the processor, determines the radar reflective information;
   a display, wherein the display, responsive to the determined radar reflective information, displays the determined radar reflective information for viewing by a driver of the vehicle as the vehicle travels along the road; and
   wherein the control, responsive to the determined radar reflective information, transmits the radar reflective information to another vehicle.

2. The vehicular radar sensing system of claim 1, wherein the radar reflective sign comprises metallic particles embedded in paint.

3. The vehicular radar sensing system of claim 2, wherein the metallic particles comprise multifaceted steel grit.

4. The vehicular radar sensing system of claim 1, wherein the control, at least in part via processing of the outputs of the receivers by the processor, determines a position of the radar reflective sign relative to the vehicle.

5. The vehicular radar sensing system of claim 1, wherein the display, when visibility of the radar reflective sign to the driver of the vehicle is compromised and responsive to the determined radar reflective information at the radar reflective sign, audibly alerts the driver of the vehicle to the radar reflective information.

6. The vehicular radar sensing system of claim 1, wherein the display comprises a heads-up-display that projects the radar reflective information for viewing by the driver of the vehicle.

7. A vehicular radar sensing system, the vehicular radar sensing system comprising:
   a radar sensor disposed at a vehicle equipped with the vehicular radar sensing system, the radar sensor having a field of sensing exterior of the vehicle;
   wherein the radar sensor comprises a plurality of transmitters that transmit radio signals and a plurality of receivers that receive radio signals, and wherein the received radio signals are transmitted radio signals that are reflected from a radar reflective sign that is present along a road being traveled by the vehicle and in the field of sensing of the radar sensor;
   a control having a processor for processing outputs of the receivers;
   wherein the radar reflective sign comprises radar reflective information that is representative of visual signage information at the radar reflective sign and information not visually present on the radar reflective sign, and wherein the information not visually present on the radar reflective sign comprises at least one selected from the group consisting of (i) a distance, (ii) an indication of a pedestrian crossing and (iii) an indication of an emergency shoulder;
   wherein the control, responsive to processing of the outputs of the receivers by the processor, determines the radar reflective information representative of the visual signage information at the radar reflective sign and the information not visually present on the radar reflective sign;
   wherein the control, at least in part via processing of the outputs of the receivers by the processor, determines a position of the radar reflective sign relative to the vehicle; and
   a display, wherein the display, responsive to the determined radar reflective information representative of the visual signage information at the radar reflective sign and the information not visually present on the radar reflective sign, displays a virtual sign such that the virtual sign appears to a driver of the vehicle at the radar reflective sign, the virtual sign including the determined radar reflective information representative of the visual signage information at the radar reflective sign.

8. The vehicular radar sensing system of claim 7, wherein the display comprises a heads-up-display that projects the virtual sign for viewing by the driver of the vehicle.

9. The vehicular radar sensing system of claim 7, wherein the control controls at least one guidance function of the vehicle responsive at least in part to the determined radar reflective information at the radar reflective sign.

10. The vehicular radar sensing system of claim 9, wherein the radar reflective sign comprises at least one selected from the group consisting of (i) a radar reflective linear barcode and (ii) a radar reflective two-dimensional barcode.

11. The vehicular radar sensing system of claim 7, wherein the control, responsive to the determined radar reflective information, transmits the radar reflective information to another vehicle.

12. The vehicular radar sensing system of claim 7, wherein the radar reflective sign comprises a radio-frequency identification (RFID) tag.

13. A vehicular radar sensing system, the vehicular radar sensing system comprising:
   a radar sensor disposed at a vehicle equipped with the vehicular radar sensing system, the radar sensor having a field of sensing exterior of the vehicle;
   wherein the radar sensor comprises a plurality of transmitters that transmit radio signals and a plurality of receivers that receive radio signals, and wherein the received radio signals are transmitted radio signals that are reflected from a radar reflective sign that is present along a road being traveled by the vehicle and in the field of sensing of the radar sensor;
a control having a processor for processing outputs of the receivers;
wherein the radar reflective sign comprises radar reflective information;
wherein the radar reflective information at the radar reflective sign comprises information not visually present on the radar reflective sign and at least one selected from the group consisting of (i) speed information, (ii) street name information and (iii) street direction information, and wherein the information not visually present on the radar reflective sign comprises at least one selected from the group consisting of (i) a distance, (ii) an indication of a pedestrian crossing and (iii) an indication of an emergency shoulder;
wherein the control, responsive to processing of the outputs of the receivers by the processor, determines the radar reflective information; and
wherein the control controls at least one guidance function of the vehicle responsive at least in part to the determined radar reflective information.

14. The vehicular radar sensing system of claim 13, wherein the radar reflective sign comprises at least one selected from the group consisting of (i) a radar reflective linear barcode and (ii) a radar reflective two-dimensional barcode.

15. The vehicular radar sensing system of claim 13, further comprising a display, wherein the display, responsive to the determined radar reflective information, displays the determined radar reflective information for viewing by a driver of the vehicle as the vehicle travels along the road.

16. The vehicular radar sensing system of claim 15, wherein the display comprises a heads-up-display that projects the determined radar reflective information for viewing by the driver of the vehicle.

17. The vehicular radar sensing system of claim 13, wherein the radar reflective information is representative of visual signage information at the radar reflective sign.

18. The vehicular radar sensing system of claim 13, wherein the radar reflective sign comprises metallic particles embedded in paint.

19. The vehicular radar sensing system of claim 18, wherein the metallic particles comprise multifaceted steel grit.

20. The vehicular radar sensing system of claim 13, wherein the control, at least in part via processing of the outputs of the receivers by the processor, determines a position of the radar reflective sign relative to the vehicle.

21. The vehicular radar sensing system of claim 13, wherein a display, when visibility of the radar reflective sign to the driver of the vehicle is compromised and responsive to the determined radar reflective information at the radar reflective sign, audibly alerts the driver of the vehicle to the radar reflective information.

22. The vehicular radar sensing system of claim 13, wherein the radar reflective sign comprises a radio-frequency identification (RFID) tag.

23. The vehicular radar sensing system of claim 13, wherein the radar reflective sign comprises preformed thermoplastic film.

* * * * *